Aug. 19, 1969   W. J. DE GAIN   3,461,531
METHOD OF MAKING A TUBULAR PRODUCT
Filed March 9, 1967   2 Sheets-Sheet 1
FIG. 8
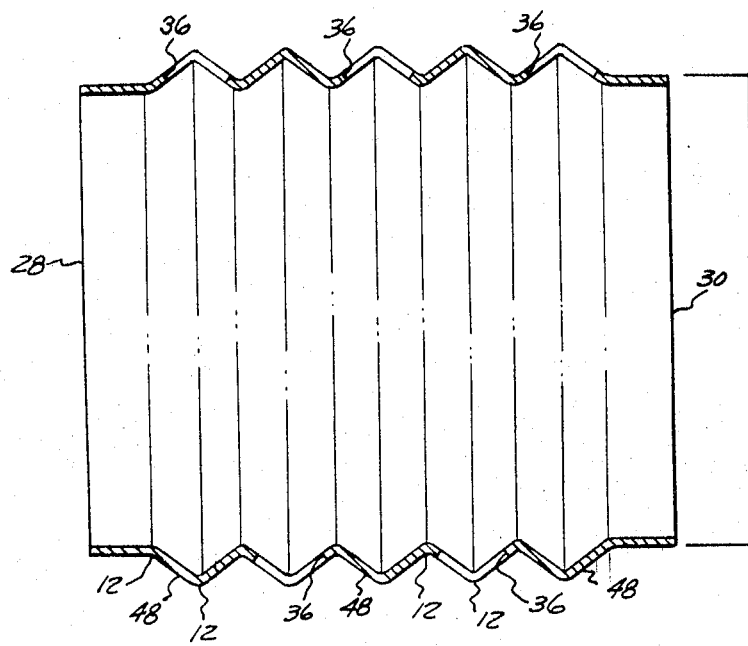
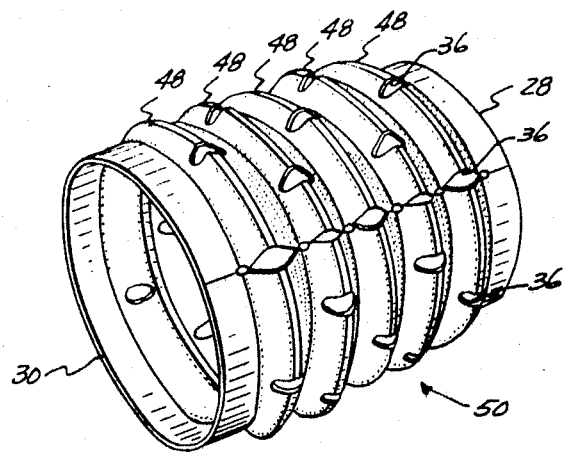
FIG. 1
INVENTOR
WILLIAM J. De GAIN
BY *Hauke, Kraus, & Gifford*
ATTORNEYS Aug. 19, 1969  W. J. DE GAIN  3,461,531
METHOD OF MAKING A TUBULAR PRODUCT
Filed March 9, 1967  2 Sheets-Sheet 2
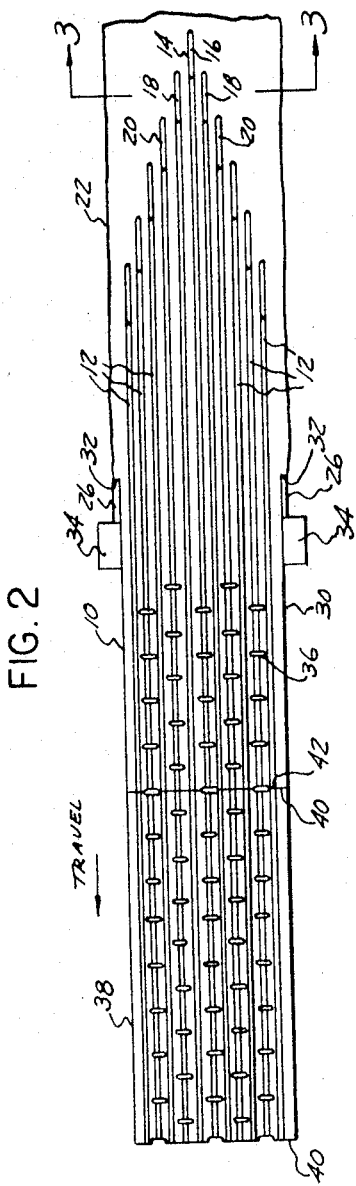
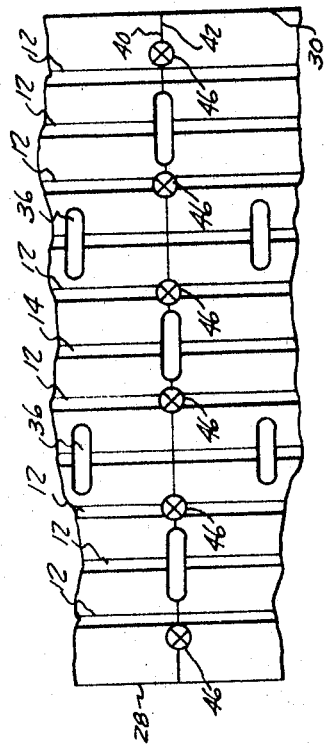
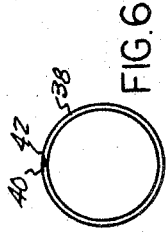
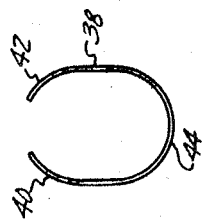
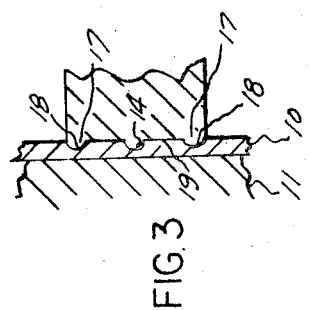
INVENTOR
WILLIAM J. De GAIN
BY Hauke, Kruse, & Gifford
ATTORNEYS United States Patent Office 3,461,531
Patented Aug. 19, 1969

3,461,531
METHOD OF MAKING A TUBULAR PRODUCT
William J. De Gain, 4228 Phillip, Detroit, Mich. 48215
Continuation-in-part of application Ser. No. 565,223, July 14, 1966. This application Mar. 9, 1967, Ser. No. 621,948
Int. Cl. B23k 31/02; F16d 9/06
U.S. Cl. 29—163.5       21 Claims

ABSTRACT OF THE DISCLOSURE

A method for making a tubular product having axially spaced annular ridges from a sheet of flat stock. The method comprises progressively advancing a sheet of flat stock between a series of coining stations. Each coining station squeezes an elongated indentation in the stock extending in the direction of the stock advance. The indentations are connected by successive stations so that a series of continuous parallel grooves are formed. The center groove is formed in each transverse section of stock by the initial die and the remaining grooves formed in pairs in successive steps in laterally outward progression from the center groove section. Each fully grooved transverse section of stock advances to a trimming station where the opposite edges are reduced to an even width. The grooved stock is then perforated with a pattern chosen to accommodate the finished product and cut to a predetermined length. The leading trailing edges of the grooved blanks are joined together to form a tubular blank with the grooves forming annular rings about the axis of the tube. An expanding mandrel then radially enlarges alternate grooves to form a series of annular ridges.

CROSS REFERENCE TO RELATED APPLICATIONS

This application is a continuation-in-part of my application for "Shock Absorber Structural Member," filed July 14, 1966, Ser. No. 565,223 now Patent No. 3,412,628.

BACKGROUND OF THE INVENTION

Field of the invention

This invention relates to a method for forming a tubular product having a series of spaced annular ridges from a sheet of flat stock. Conventionally tubular products having a non-uniform cross section are manufactured from a tubular stock having a uniform cross section by radially expanding the stock at selected axial intervals. This general approach is not effective to produce a tubular product of the type disclosed in my aforementioned co-pending application which must collapse uniformly throughout its length. In addition, where the tubular product must be perforated to provide a controlled collapse, the tubular blank requires a difficult manufacturing operation.

The present invention obviates the manufacturing problems of the prior art in producing a tubular product of this character by providing a method wherein the tubular product is developed from flat stock.

SUMMARY

The preferred method of practicing the present invention, which will be subsequently described in greater detail, comprises advancing a continuous sheet of flat stock through a progressive die to perform a series of grooving, trimming and perforating operations on the stock. A series of coining dies squeeze a series of regularly spaced parallel and continuous grooves in the flat stock in a progressive manner. The coining dies are arranged so that the initial groove section formed in each transverse segment of stock is the center groove. The succeeding dies produce groove sections in the segment in a laterally outwardly timed progression from the center groove.

The succeeding groove sections are coined in laterally spaced pairs with a pad section extending between the die elements so that the metal flow produced by the coining operation and resulting from the reduction in the thickness of the stock at the grooves is directed laterally outwardly from the center groove and each succeeding groove. This metal flow gradually widens the side edges of the stock, normally, in an uneven manner. Therefore, as each longitudinal segment of the stock is provided with a full set of grooves, the side edges are trimmed to a predetermined even width. The trimming operation forms a pair of lateral shoulders between the trimmed and untrimmed portions of the stock which provide a reference point for advancing the stock through the dies.

The trimming operation is succeeded by a perforation operation performed by suitable piercing dies. The perforations are associated with the ridges of the finished product, their size and arrangement controlling the collapse of the finished product. Alternate grooves are perforated with the perforations between adjacent perforated grooves staggered to reduce stress concentrations.

The grooved and perforated stock is then cut off at a predetermined length to form a blank having a leading and a trailing edge. The leading and trailing edges are joined by any of the conventional methods to form a closed tubular shape.

The tubular blank is processed by an expansion operation wherein the annular portion between alternate grooves is expanded to form an annular ridge. This expansion process is controlled by the grooves which act as a circular hinge axis for the material adjacent each groove. The grooves act as annular hinge axes for the annular portions of the tube between adjacent grooves when a collapsing force is imposed on the finished product so that the tube collapses in a predictable configuration at a controlled rate.

The expansion process preferably is performed in a sequential manner, that is by forming the ridges in succession from one end of the tube toward the other. However, the expansion process can be formed in a simultaneous manner, that is by forming all of the ridges in one operation by providing means for the expansion tools to move toward a concentrated relationship as the tube shortens from its unridged length to its finished length.

It is therefore an object of the present invention to provide an improved method for manufacturing a tubular product having a series of annular ridges from a sheet of flat stock.

It is another object of the present invention to provide a method for making an improved collapsible tubular structure from a sheet of flat stock by forming a grooved blank having leading and trailing edges, joining the leading edge to the trailing edge to provide a tubular blank having annular grooves, and then expanding the walls of the tube between alternate grooves to form a series of spaced annular ridges.

It is another object of the present invention to provide an improved tubular product from a sheet of flat stock by advancing a sheet of stock in a progressive die having a series of coining dies arranged to progressively form a series of parallel grooves beginning with a center groove and then laterally outwardly toward the side edges of the stock, cutting the stock at a selected length to form a pair of opposite longitudinal edges, joining the longitudinal edges to form a tubular section and then radially expanding the portions of the tube adjacent alternate grooves to form a series of spaced annular ridges.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 1 is a perspective view of a tubular product made in accordance with the preferred practice of the invention, and FIG. 2 is a view of a continuous sheet of stock being processed through a progressive die in accordance with the preferred practice of the invention;

FIG. 3 is an enlarged sectional view taken along lines 3—3 of FIG. 2; and

FIGS. 4 to 8 illustrate succeeding operations in producing the product of FIG. 1.

DESCRIPTION OF THE PREFERRED EMBODIMENT

Now referring to the drawings, the preferred method of practicing the invention comprises advancing an elongated, continuous sheet of flat stock 10 through a progressive die 11 having a series of coining dies arranged to form a series of parallel grooves 12. The grooves 12 are preferably equispaced and parallel to the direction of progressive travel of the stock 10.

The technique for forming the continuous grooves 12 is of particular importance and requires that the first groove section in an ungrooved segment of the sheet 10 is the center groove 14. The center groove is formed in a metal squeezing operation preferably by a coining die arranged to produce an elongated groove section 16. Thus, the center groove 14 comprises a progressively formed series of overlapping groove sections 16. As each groove section 16 is formed at the initial coining station, a second pair of coining dies 17 produce a pair of groove sections 18 in lateral spaced relationship to the previously formed groove section 16 of the center groove. The dies 17 are joined by a pad section 19 which engages the transverse portion of stock between each newly formed pair of groove sections.

Similarly, the third coining station produces a pair of groove sections 20 forming an extension of each second lateral groove from the middle groove 14.

Thus, it can be seen that the grooves at each longitudinal section of the sheet 10 are formed in a progressive manner laterally outwardly from the center groove 14, and toward the lateral side edges. Similarly each pair of dies has a pad portion engaging the stock between the dies. This pad arrangement causes the metal flow produced by each stroke of the coining dies to flow laterally outwardly toward an unrestrained area. The metal flow results from a gradual displacement of the material of the stock 10 as the thickness of the stock is reduced at the grooves. The grooves could also be squeezed by a series of rolling spool-like members having enlarged rims forming the grooves and the body of the spool controlling the metal displacement.

As the metal flows toward the sides of stock 10, the side edges 22 and 24 widen and assume an irregular shape. After each fully grooved longitudinal section of the sheet 10 advances past the final coining station, a pair of trimming dies 26 reduce the side edges 22 and 24 to a finished, even width to form finished side edges 28 and 30.

The trimming dies 26 form a pair of shoulders 32 between the unfinished and the finished side edges of the stock 10. Preferably each stroke of the trimming dies 26 removes a longitudinal strip of material between successively formed shoulders 32 having a length referred to as the "pitch." This pitch length corresponds to the incremental distance that the sheet 10 is advanced between successive strokes of the progressive die. Thus, the shoulders 32 form an abutment for actuating stop means 34 when the sheet 10 has been indexed a sufficient distance between successive die strokes. The pitch length is selected so that the ratio of the length of the grooved blank and the pitch length is an integral multiple.

After the grooving and trimming steps, the stock 10 is perforated by a set of piercing dies. A series of elongated perforations 36 are formed in alternate grooves beginning with the second groove from each of the finished side edges.

Depending on the finished product, slots or slits could be formed instead of the perforations illustrated. The perforations of the preferred method control the collapsing characteristics of the finished tube and are preferably elongated in a direction transverse to their respective grooves. Preferably, the ends of each perforation are rounded to reduce stress concentrations.

The perforations between adjacent perforated grooves are formed in a staggered pattern to provide uniform stress transfer characteristics. Preferably the grooving and perforating operations are performed in a progressive die apparatus arranged to form an extension of each groove 12 while forming the perforations 36 on each stroke of the die.

Suitable cutting means then cut off a grooved and perforated blank 38 having a predetermined length and a leading edge 40 and a trailing edge 42. Preferably the cutting operation separates successive blanks 38 through a transverse row of perforations 36.

The blank 36 is then formed into a closed tubular shape by any of the well-known methods and preferably by first preforming the leading and trailing edges 40 and 42 into an arcuate section as illustrated in FIG. 4. Referring to FIG. 5, the mid-section 44 between the leading and trailing edges 40 and 42 is then bent into a substantially U-shaped configuration so that the edges 40 and 42 are moved toward one another with the grooves 12 on the exterior surface.

Referring to FIG. 5, the blank 38 is closed by bringing the edges 40 and 42 into abutment to form a cylindrical tube. The edges 40 and 42 are joined together preferably by spot welding at positions 46 adjacent the perforations 36.

The tube is formed so that the grooves 12 form a series of annular rings about the axis of the tube and on the outer surface thereof. The grooves 12 are arranged in a series of parallel planes disposed perpendicular to the axis of the tubular blank.

Referring to FIGS. 6 and 7, the side edges 28 and 30 of the flat stock 38 now comprise the opposite axial ends of the tubular blank.

The tubular blank is then expanded so that the annular portions between alternate grooves 12 are expanded radially outwardly to form annular ridges 48. The peak and the valley of each ridge 48 is defined by a groove 12 expanded to an enlarged diameter and adjacent grooves 12 maintaining the original tubular diameter. As each ridge is radially expanded, preferably by an expanding mandrel, the perforations 36 tend to circumferentially expand thereby reducing the stress concentration areas in the expanded metal of the ridges 48. The pattern and the concentration of the perforations 36 controls the rate at which the completed tubular product 56 collapses and the magnitude of the force required to initiate the collapsing process.

The expansion process is preferably performed by expanding each ridge 48 in succession from one end of the tube toward the other. This method permits the ends 28 and 30 of the tube to move toward one another toward a reduced length between each expansion. However, the expansion step can be performed by expanding all of the ridges 48 simultaneously with the expanding tools arranged to move toward one another as the tube shortens toward its final finished length. It is to be understood of course that the expansion step will bring the ends 28 and 30 toward one another so that when the ridges 48 have been fully formed, the tubular product 50 has assumed its final finished length.

Although I have described the preferred embodiment of my invention in its simplest terms, it is to be understood that various changes and revisions can be made therein without departing from the spirit of the invention as expressed in the scope of the appended claims.

Having described my invention I claim:

1. A method of making a tubular product from a sheet of flat stock, said tubular product having sections with a greater diameter and sections with a lesser diameter, comprising the steps of:
   (a) squeezing a series of continuous grooves in spaced parallel relationship in a sheet of flat stock to form a grooved blank having a leading and a trailing edge, said leading and trailing edges extending in directions generally transverse to the grooves, the grooves in any longitudinal section of said blank being formed in timed progression laterally outwardly from a center groove so that the progressive formation of the grooves causes the metal movement produced by the reduction in the thickness of the stock at the grooves to flow laterally outwardly from the center grooves.
   (b) joining the leading edge to the trailing edge so that the grooved blank assumes a closed shape having a uniform cross section of said lesser diameter about an axis, and the grooves forming closed rings about the axis; and
   (c) radially expanding the tubular blank in the area of selected grooves to form annular sections with said greater diameter.

2. A method of making a tubular product as defined in claim 1, wherein said grooves are formed on a common surface of said flat stock.

3. A method of making a tubular product as defined in claim 1, wherein each of said grooves are formed by a series of coining dies arranged to progressively coin a continuous series of groove sections.

4. A method of making a tubular product as defined in claim 1, wherein each of said continuous grooves is formed by a series of successively formed groove sections, each of said groove sections having a regular length and each successive groove section overlapping the preceding groove section.

5. A method of making a tubular product as defined in claim 3, wherein a continuous sheet of said stock is progressively advanced in groove forming relationship with a series of coining stations, said coining stations operative between each advancement of the stock to simultaneously produce groove sections having a common length.

6. A method of making a tubular product as defined in claim 5, wherein said coining stations are arranged in a direction corresponding to the progressive advancement of said stock, said coining stations including a first coining station to form a center groove section and each successive coining station forming a groove section in laterally spaced relationship to a groove section formed at the preceding coining station.

7. A method of making a tubular product as defined in claim 1, including the step of trimming the side edges of a longitudinal section of said stock to a predetermined width after the grooves in said longitudinal section have been formed.

8. A method of making a tubular product as defined in claim 7, wherein said trimming step forms a pair of shoulders in the side edges of said stock between the trimmed and untrimmed portions of said stock, said shoulders providing reference abutments for controlling the advance of said stock between successive coining operations.

9. A method of making a tubular product as defined in claim 8, wherein the longitudinal distance between the leading and the trailing edges of said blank forms an integer multiple of the longitudinal distance between successive pairs of shoulders.

10. A method of making a tubular product as defined in claim 1, including the step of forming a series of spaced perforations in the grooves in said flat stock associated with the annular section having said greater diameter.

11. A method of making a tubular product as defined in claim 10, wherein the perforations between adjacent perforated grooves are arranged in a regularly spaced and staggered relationship.

12. A method of making a tubular product as defined in claim 11, wherein said perforations are elongated in a direction transverse to the grooves, the ends of each perforation terminating short of the adjacent unperforated grooves.

13. A method of making a tubular product as defined in claim 1, wherein said joining step comprises:
   (a) bending the leading and trailing edges of said blank to an arcuate shape and in a common direction away from the body of the blank;
   (b) bending the center section of the stock in a substantially U-shaped configuration so that the leading and trailing edges are moved toward one another, and
   (c) abutting the leading and trailing edges so that said blank assumes a closed shape.

14. A method of making a tubular product as defined in claim 1, wherein the annular area between alternate grooves of said blank are radially expanded to form a series of annular ridges having said greater diameter and with the intermediate grooves between said alternate grooves formed on said lesser diameter.

15. A method of making a tubular product as defined in claim 14, wherein the annular sections having said greater diameter are formed by expanding the annular areas of said grooved stock between said alternate grooves in a longitudinally progressive relationship.

16. A method of making a tubular product as defined in claim 14 wherein said annular ridges are formed by expanding the annular areas between said alternate grooves in a simultaneous relationship.

17. A method of making a tubular product as defined in claim 1, wherein said grooves are formed in a continuous sheet of flat stock and including the step of cutting grooved sections to a predetermined length to form said grooves blank.

18. A method of making a tubular product as defined in claim 1, wherein said grooves are formed in pairs in lateral outward progression from a center groove, each of said pairs formed by a pair of laterally spaced die sections connected by a pad section, said pad section causing the metal displacement produced by the die sections to flow laterally outwardly from the grooves formed by said spaced die sections.

19. A method of making a tubular product as defined in claim 18, wherein said grooves are formed by a coining die.

20. A method of making a tubular product as defined in claim 1, wherein said continuous grooves are formed by a series of connecting groove sections in a progressive die apparatus, each stroke of the die apparatus producing a grooved extension of each of said continuous grooves.

21. A method of making a tubular product as defined in claim 20, wherein each stroke of said progressive die apparatus forms a perforation in a grooved section of said stock.

References Cited
UNITED STATES PATENTS

| | | | |
|---|---|---|---|
| 24,480 | 6/1859 | Montgomery | 138—173 |
| 1,053,614 | 2/1913 | Layne | 29—163.5 X |
| 1,057,098 | 3/1913 | Smith | 61—11 |
| 1,169,689 | 1/1916 | Smith | 61—11 |
| 1,270,402 | 6/1918 | Fulton | 29—454 |
| 2,771,077 | 11/1956 | Karlsson et al. | 29—163.5 X |
| 2,965,961 | 12/1960 | Schindler et al. | 29—454 |
| 2,371,991 | 3/1945 | Harding. | |
| 3,326,091 | 7/1967 | Allen | 29—454 X |

CHARLIE T. MOON, Primary Examiner

U.S. Cl. X.R.

29—454, 475; 61—11; 138—173